(12) United States Patent
Bagci et al.

(10) Patent No.: US 6,270,659 B1
(45) Date of Patent: Aug. 7, 2001

(54) FUEL FILTERING SYSTEM FOR AN ENGINE

(75) Inventors: Ismail Bagci; Byron A. Pardue; Paul D. Miller, all of Cookeville; Charles W. Hawkins, Sparta; Wayne N. Harrington, Cookeville, all of TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/346,718

(22) Filed: Jul. 2, 1999

(51) Int. Cl.$^7$ .................................................... B01D 35/01
(52) U.S. Cl. ........................ 210/111; 210/115; 210/130; 210/436; 210/438
(58) Field of Search ........................ 210/106, 111–115, 210/194, 197, 312, 313, 416.4, 428, 436, 472, 483, 497.01, 130, 433.1, 438; 123/514, 516

(56) References Cited

U.S. PATENT DOCUMENTS

| | | | |
|---|---|---|---|
| 2,223,701 | * 12/1940 | Olson et al. | 210/313 |
| 3,193,101 | 7/1965 | Humbert, Jr. | 210/130 |
| 3,249,229 | * 5/1966 | Kasten | 210/197 |
| 3,384,242 | * 5/1968 | Kudalty et al. | 210/436 |
| 3,529,721 | 9/1970 | Papp | 210/130 |
| 3,598,237 | 8/1971 | Aspinwall | 210/130 |
| 3,599,792 | 8/1971 | Stripp | 210/130 |
| 4,296,723 | 10/1981 | Aldrich | 123/510 |
| 4,420,396 | * 12/1983 | Yamamoto et al. | 210/472 |
| 4,502,955 | * 3/1985 | Schaupp | 210/416.4 |
| 4,680,110 | 7/1987 | Davis | 210/114 |
| 4,948,503 | 8/1990 | Baumann et al. | 210/232 |
| 4,976,852 | 12/1990 | Janik et al. | 210/86 |
| 5,053,120 | 10/1991 | Möllmann | 210/86 |
| 5,263,456 | 11/1993 | Owens-Evans | 123/495 |
| 5,355,860 | 10/1994 | Ekstam | 123/516 |
| 5,413,711 | 5/1995 | Janik | 210/300 |
| 5,489,384 | 2/1996 | Janik et al. | 210/436 |
| 5,525,225 | 6/1996 | Janik et al. | 210/436 |
| 5,538,626 | 7/1996 | Baumann | 210/130 |
| 5,589,060 | 12/1996 | Gebert et al. | 210/310 |
| 5,660,729 | 8/1997 | Baumann | 210/457 |
| 5,718,825 | 2/1998 | Greive et al. | 210/298 |
| 5,770,054 | 6/1998 | Ardes | 210/130 |
| 5,785,032 | 7/1998 | Yamashita et al. | 123/509 |
| 5,814,215 | 9/1998 | Bruss et al. | 210/130 |

* cited by examiner

Primary Examiner—Matthew O. Savage
(74) Attorney, Agent, or Firm—Woodard, Emhardt, Naughton, Moriarty & McNett

(57) ABSTRACT

A fuel filter for an engine includes a housing having an interior space and is assembled into a fuel flow path between a source of fuel and the engine. The housing includes a passageway which has an inlet aperture which is used to control the delivery of fuel to either the engine or back to the source of fuel. The housing also includes a return-fuel passageway which is in flow communication with the interior space and is adapted to couple to the source of fuel. A filter cartridge is installed within the housing and includes an end cap with an air vent tube having an inlet opening. The air vent tube is designed so as to assemble into the passageway, so as to plug the inlet aperture. Once the inlet aperture is plugged by the air vent tube, the flow entrance to the passageway is raised from the inlet aperture to the inlet opening of the air vent tube. The plugging of the inlet aperture by the air vent tube allows fuel to be delivered to the engine. When the air vent tube is not assembled into the inlet aperture, fuel is drained back to the source and does not reach the engine. The fuel filter further includes a pressure-regulated control valve which is installed within the return fuel passageway and is activated by the internal pressure within the housing. This valve permits excess fuel to be returned to the source of fuel.

5 Claims, 3 Drawing Sheets

FUEL FILTERING SYSTEM FOR AN ENGINE

BACKGROUND OF THE INVENTION

The present invention relates in general to a fuel filter and a fuel filtering system for use with a vehicle, wherein the fuel filter is located "downstream" from a fuel pump. More specifically, the present invention relates to the design of a fuel filter which is used within a fuel filtering system and which includes a pressure-controlled, spring-biased, internal valve that enables the automatic draining of excess fuel back to either the fuel tank or to a suction-side primary filter. The fuel filter of the present invention includes a water-separation capability such that accumulated water is automatically drained with excess fuel by means of the internal valve, thereby precluding the need for a separate water-drain mechanism. The design of the present invention also precludes the need to prompt the user to activate or open any separate water-drain mechanism in order to periodically drain the accumulated water from the interior of the fuel filter housing.

Fuel filters and fuel filtering systems have been used in the automotive field and related vehicle and equipment fields for a number of years. The structural configurations of these earlier fuel filters and fuel filtering systems have included a number of design variations and improvements, all in an effort to try and solve certain design shortcomings. The present invention is no different in this regard. Certain disadvantages and shortcomings of existing fuel filter and fuel filtering system designs have been considered by the present inventors and the present invention provides structural design improvements in order to overcome and/or improve upon those disadvantages and shortcomings. One concern with fuel filtering systems is whether unfiltered fuel can be delivered to the fuel injectors or other critical engine components which utilize the fuel for combustion. Since small particulate matter can be detrimental to the long term efficacy of the fuel injection equipment (FIE), filtering of the fuel is particularly important for vehicles which use modern, high pressure FIE. When the filtering media cartridge is not installed in the filter housing, it would be an improvement to be able to prevent fuel flow to the FIE. The present invention provides this capability by means of a unique drain passageway which is wide open whenever the filtering media cartridge is removed.

Another concern with fuel filters which have a screw-on or snap-on cap, cover or lid is the entrapment of air inside of the fuel filter housing. As fuel is delivered to the fuel filter, the trapped air can only exit by passing to the engine or injectors or by flowing back to the fuel tank. Since the trapped air is at the top of the fuel volume within the filter housing, its most likely exit path is to flow with the fuel to the FIE and combustion cylinder. Accordingly, trapped air can interfere with the smooth and continuous delivery of fuel to the engine. It would therefore be an improvement to be able to route the trapped air back to the fuel tank. The present invention provides this capability by a unique air vent tube which cooperates with the aforementioned drain passageway.

Another concern with fuel filters and fuel filtering systems which include a water-separation capability is when and how to drain the accumulated water. Since the separated water typically accumulates at the base of the fuel filter housing, below the fuel, the most common approach is to provide a separate water drain valve. Release or activation of the water drain valve can be manual or automatic. With manual draining, the user has to remember to periodically open the drain valve in order to drain the accumulated or collected water. While automatic drain systems are frequently based on the water level and the electronic sensing of that water level, these designs still necessitate a separate drain valve and associated hardware and electronics. These drain systems also involve the addition of hardware, components and electronics outside of the filter housing which can in turn interfere with other engine components.

The fuel which is pumped to the fuel filter is delivered at a flow rate which is greater than the usage rate of the engine. This means that there is excess fuel which has to be returned to a point in the flow loop which is upstream of the fuel filter, such as to the fuel tank or to the fuel pump, for example. The present invention provides a design improvement to this task by incorporating a pressure-regulated drain valve that automatically drains both excess fuel and accumulated water whenever the internal pressure within the filter housing exceeds a predetermined level. This automatic draining of accumulated water precludes the need for any external components, hardware or electronics. The design of the present invention also precludes the need for the user to remember to periodically activate or release the water drain valve.

The improvements of the present invention represent novel and unobvious advances in the state-of-the-art for fuel filters and fuel filtering systems.

SUMMARY OF THE INVENTION

A fuel filter for an engine according to one embodiment of the present invention comprises a housing having an interior space and being constructed and arranged to be assembled into a fuel flow path between a source of fuel and the engine, the housing including an integral flow passageway having a flow inlet aperture and being adapted for flow connection to the source of fuel. Included as part of the fuel filter is a fuel filter cartridge which is installed within the housing and includes an end cap with an air vent tube which has an inlet opening and an exit opening. The air vent tube is assembled into the integral flow passageway so as to plug the flow inlet aperture such that the flow entrance to the integral flow passageway is changed from the flow inlet aperture to the inlet opening of the air vent tube. By positioning the inlet opening of the air vent tube near the upper end of the filter housing, fuel is able to be delivered to the engine only when the filter cartridge is properly installed.

One of the objects of the present invention is to provide an improved fuel filter.

Related objects and advantages of the present invention will be apparent from the following description.

DESCRIPTION OF THE PREFERRED EMBODIMENT

Figure 1:
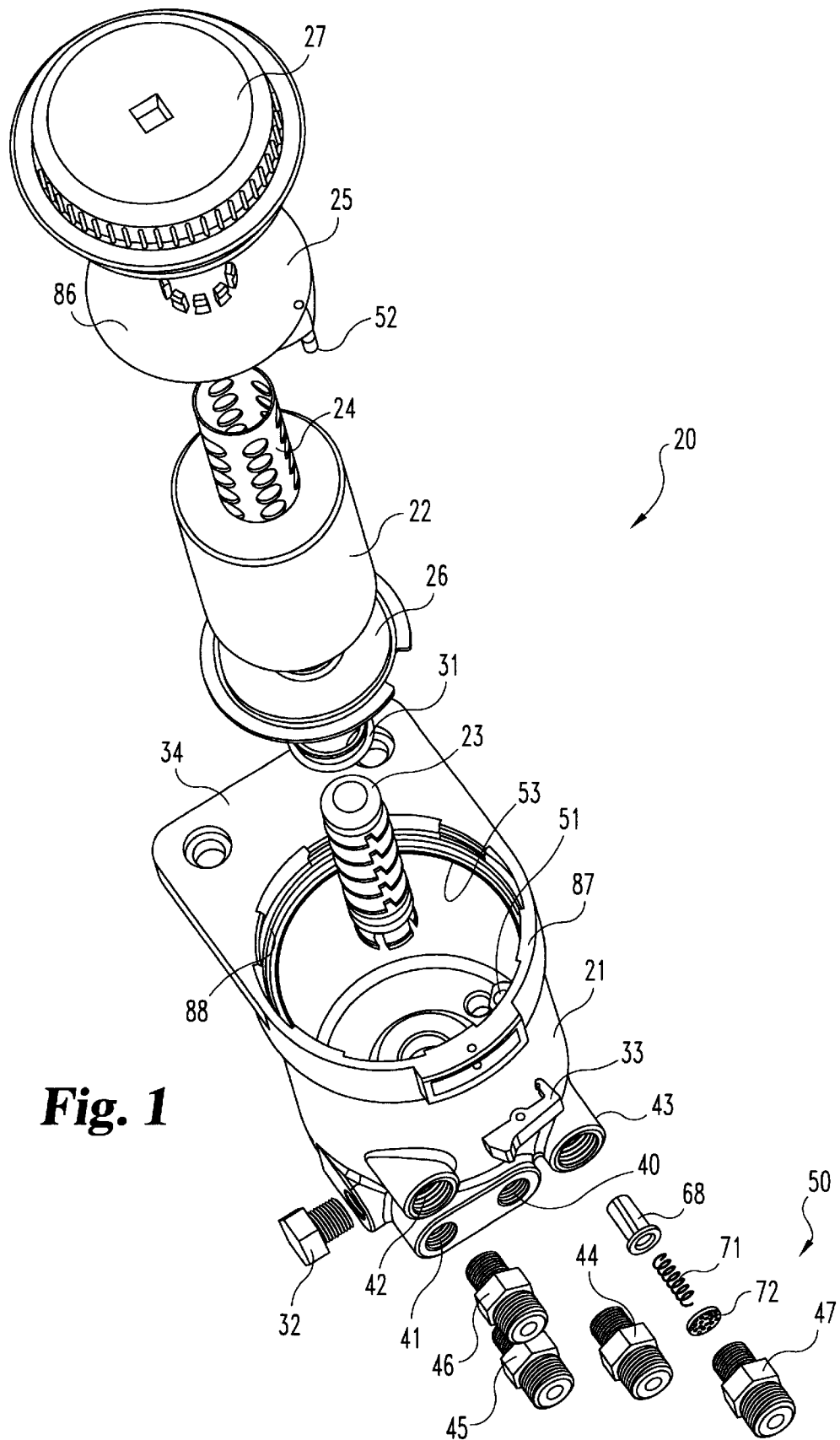
FIG. 1 is an exploded view of a fuel filter according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated as an exploded view, a fluid filter 20 which is configured according to a preferred embodiment of the present invention. The fluid in this preferred embodiment is fuel. Fuel filter 20 includes, as some of its primary components, a main housing 21, filter element 22, standpipe 23, centertube 24, upper end cap 25, lower end cap 26, and cover 27. Also included as part of the construction of fuel filter 20 is a seal 31, plug 32, latch 33, and mounting bracket 34. Bracket 34 is preferably an integral or unitary part of main housing 21.

The main housing 21 is a unitary casting and is configured with fuel outlet ports 40 and 41, fuel inlet port 42 and excess fuel return port 43. These various ports are configured as hollow passageways with a generally cylindrical geometry. In the preferred embodiment of the present invention, the disclosed fuel filter 20 is used in conjunction with a V-8 engine and the fuel injectors are grouped with four injectors in the left bank and the remaining four injectors in the right bank. One outlet port 40 delivers fuel to the left bank of injectors and the other outlet port 41 delivers fuel to the right bank of injectors. Threaded fluid fittings 44, 45, 46 and 47 are threaded into the ends of the corresponding ports as illustrated and serve to facilitate the connection of the required fluid conduits (not illustrated) to the four ports. Fitting 44 is assembled into port 40, fitting 45 into port 41, fitting 46 into the fuel inlet port 42, and fitting 47 into the fuel return port 43. A pressure-regulated drain valve 50 is assembled into the hollow interior of return port 43 prior to assembly of fitting 47.

Figure 2:
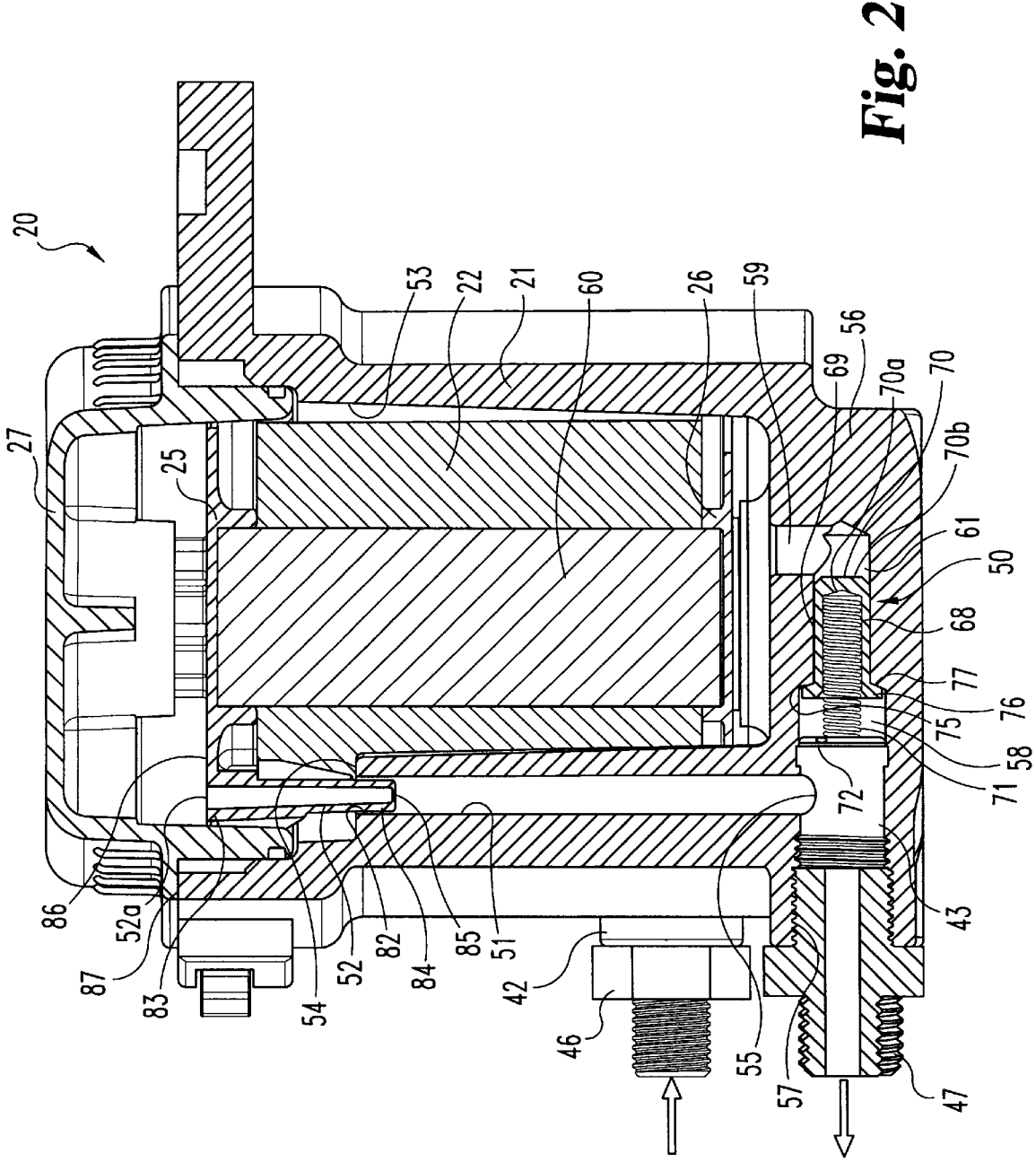
FIG. 2 is a side elevational view in full section of the FIG. 1 fuel filter as assembled.

The interior of the main housing 21 is configured to include a fuel drain passageway 51. A cooperating air vent tube 52 which fits into passageway 51, is included as part of the upper end cap 25. The details of the overall construction of filter 20 are also illustrated in FIG. 2, and the overall fuel filtering system for filter 20 is diagrammatically illustrated in FIG. 3.

Since much of what is illustrated as comprising the construction of fuel filter 20 will be known to a person of ordinary skill in the art, the focus of the present invention is directed to two areas which constitute two of the more important aspects of the present invention. As illustrated, the main housing 21 is a unitary casting and the fuel drain passageway 51 is cast as part of the inner wall 53 of the main housing. Passageway 51 extends from upper ledge 54 downwardly to its point of intersection 55 with return port 43. There is flow communication between return port 43 and passageway 51. Return port 43 which extends into the base 56 of housing 21 includes a first (threaded) portion 57 which receives fitting 47 and a second portion 58 which receives drain valve 50. Connecting fluid passageway 59 establishes a fuel flow path from the hollow interior of housing 21 to the innermost end 61 of inner portion 58. This flow path allows excess fuel and accumulated water in the interior of housing 21 to flow through passageway 59, around drain valve 50, out the threaded portion 57 of excess fuel port 43, through fluid fitting 47 and back upstream to either the fuel tank 64 or to the primary fuel filter 65 (see FIG. 3). Region 60 is intended to diagrammatically represent the assembly of the standpipe 23 into the housing base and the telescoping receipt of the centertube 24 by the standpipe 23. Since this is a typical construction technique for fluid filters, additional details are not necessary.

The pressure-regulated drain valve 50 includes a hollow valve plunger 68 which has a grooved or fluted outer body 69 and a closed base 70. Also included as part of valve 50 is spring 71 which fits within the hollow interior of valve plunger 68 and a fixed support plate 72. Circular support plate 72 is press fit into position within inner portion 58 and functions to fix the position of (one end of) spring 71 and in effect, the position of the drain valve 50. The spring length and spring constant are selected so as to establish the fluid pressure which will cause the valve plunger 68 to move to the left in the FIG. 2 illustration, which is a direction toward the outer surface of housing 21.

Inner portion 58 is counter-bored in order to create valve seat surface 75 which has a conical geometry. Valve plunger 68 is configured with an abutment flange 76 which has a conical surface 77 with a size, shape and overall geometry which is designed to seat on valve seat surface 75 in a sealed or liquid-tight manner. It should be understood that the axial distance between the fixed position of support plate 72 and surface 75 relative to the location of closed base 70 and the length of spring 71 creates a continuous spring force on the inner surface 70a of base 70 and this pulls the conical surface 77 of flange 76 tightly against valve seat surface 75. As described, the drain valve 50 is in a normally-closed position due to the action of spring 71. The valve is movable to a flow-enabling position due to the internal pressure.

In operation, when the excess fuel and any accumulated water reach a fluid pressure greater than approximately 45 psi, as seen by the exposed end 70b of base 70 which is positioned adjacent the edge of passageway 59, the valve plunger 68 moves in the direction of fitting 47 which in the illustration of FIG. 2, is to the left. This movement of the valve plunger 68 lifts surface 77 off of surface 75. Since the outer body of the valve plunger 68 includes full length grooves, the fuel and any water present adjacent base 70 on the interior of the main housing, is able to flow through the grooves and then through the separation between surfaces 77 and 75. At this point, the fuel and any water pass through drain holes in plate 72. From here the fuel and any water is able to flow out of the filter housing by means of excess fuel return port 43 and threaded fluid fitting 47. The predetermined pressure setting of 45 psi, which is the threshold level which needs to be exceeded in order to open the drain valve, is controlled primarily by the spring constant of spring 71 and by the surface area of the exposed circular end 70b of base 70. While there may be a slight counter-acting pressure on the side of the valve plunger 68 which is opposite to passageway 59, any flow-through fuel passageway 51 more likely flows directly out through port 43 and fitting 47. If this flow is rapid enough, a small venturi-effect can actually be created on this opposite side of the pressure-regulated drain valve 50. If a venturi-effect is created, there would actually be a small pressure drop in this location. However, the magnitude of any venturi-effect and thus, the magnitude of any pressure drop, is believed to be negligible in view of the minimum flow volume and the minimal flow rate of fuel through passageway 51 when the fuel filter is fully assembled and functioning within the fuel filtering system 79 of FIG. 3.

If the fuel filter element 22 is not installed within the remainder of fuel filter 20, it is preferred that fuel not be delivered to the engine. In this way, any small particulate matter that might otherwise interfere with the fuel injectors is prevented from reaching the injectors. Since the fuel pump 80 can be operated whether or not a fuel cartridge is installed, any such safety mechanism or safety feature would preferably be incorporated directly into the fuel filter. According to the present invention, the fuel drain passageway 51 is integrally cast as part of the unitary main housing 21 and allows fuel to drain by way of port 43 once the fuel level in the housing reaches the height of ledge 54 which defines the upper inlet opening 82 of passageway 51. Once the fuel reaches the level of ledge 54, it is able to flow into the inlet opening 82 and from there down through passageway 51 in the direction of the base and to the point of intersection 55 between passageway 51 and portion 58. Any fuel which is going to be delivered to the two banks of fuel injectors, must rise to a level above ledge 54. However, any fuel at that level, assuming that the air vent tube 52 is not installed, is routed to the excess fuel return port 43, thereby preventing any unfiltered fuel from ever reaching the injectors as unfiltered fuel.

When the air vent tube 52 is inserted into inlet opening 82 and into passageway 51, the flow opening 82 is closed (i.e. plugged) and the fuel level within the main housing is then above to rise above ledge 54 to a level that allows the fuel to be delivered to the fuel injectors. The insertion of tube 52 into opening 82 effectively raises the flow inlet location for passageway 51 to a location which is closer to cover 27. Inlet opening 52a is located adjacent to cover 27 as is illustrated. While tube 52 is open at its top 83 (i.e. inlet opening 52a) and at its free (lower) end 84, the opening 85 at end 84 is quite small and noticeably smaller in diameter than the remainder of the hollow interior of tube 52, including the opening 52a at top 83. The size of opening 85 freely permits air which has little or no measurable viscosity to flow and escape from the interior of the fuel filter. However, the more viscous fuel, at least compared to air, has a difficult time in freely passing through the smaller opening 85. Consequently, any fuel which might be present at the open top 83 of tube 52 and thereby drain through tube 52 and ultimately through passageway 51, is of a minimal amount compared to the substantially larger volume of fuel delivered to the fuel filter by the fuel pump 80. The large volume of fuel which is handled by the fuel filter is sufficient to fully supply the fuel injectors and allow the excess to drain by way of the pressure-regulated drain valve 50, notwithstanding that there might also be some minor or minimal flow by way of air vent tube 52 and fuel drain passageway 51.

The fit of tube 51 into opening 82 of passageway 51 only needs to be reasonably close such that if there is any leakage flow through this interface, it is of minimal volume so as to not affect the rising fuel level and a sufficient supply of fuel to the fuel injectors. The tube 52 is an integral part of the unitary upper end cap 25 which is securely and fixedly attached to the upper end of the filter element 22. Consequently, as the filter element 22 with its centertube 24 assembled and with both end caps attached, is inserted onto standpipe 23, care must be taken to align the air vent tube 52 with the housing 21 so that the air vent tube 52 fits into and plugs opening 82. In order to facilitate this assembly, alignment indicia (not illustrated) are provided (preferably marked) on the upper surface 86 of the upper end cap 25 and on the upper edge 87 of the main housing 21. These marked alignment indicia simply need to be circumferentially aligned so as to be in the same radial line and once this is done, the tube 52 will be accurately aligned with opening 82 for direct and interference-free insertion of tube 52 into opening 82 upon the axial movement of the filter cartridge onto the standpipe 23. The assembly of the two end caps and the centertube to the filter element 22 creates the referenced filter cartridge.

As the cover 27 is assembled onto the upper open end 88 of the main housing 21, it is possible for air to be trapped. The pressure head created by this trapped air could interfere with the assembly of the cover, as well as create a pressure on the residual fuel and force some of this fuel to drain. Activation of the fuel pump would then push this trapped air through to the injectors which would delay the delivery of fuel. By including the air vent tube 52 as part of the present invention, a portion of this trapped air is able to escape by way of tube 52 and passageway 51 to port 43. While some air may still be trapped, a substantial portion is initially vented. Then as the fuel level rises, the remainder of the trapped air or at least the majority of it, is able to escape from the interior of the main housing in the same manner. As a consequence of this unique air vent tube and its interface with the passageway 51, most all of the trapped air is vented back to the fuel tank (or possibly to the primary fuel filter) and only a very minimal amount of air, if any, is actually seen by the fuel injectors. In the preferred embodiment, the open end 88 of the housing is internally threaded and the cover 27 is externally threaded for threaded assembly into the open end.

Figure 3:
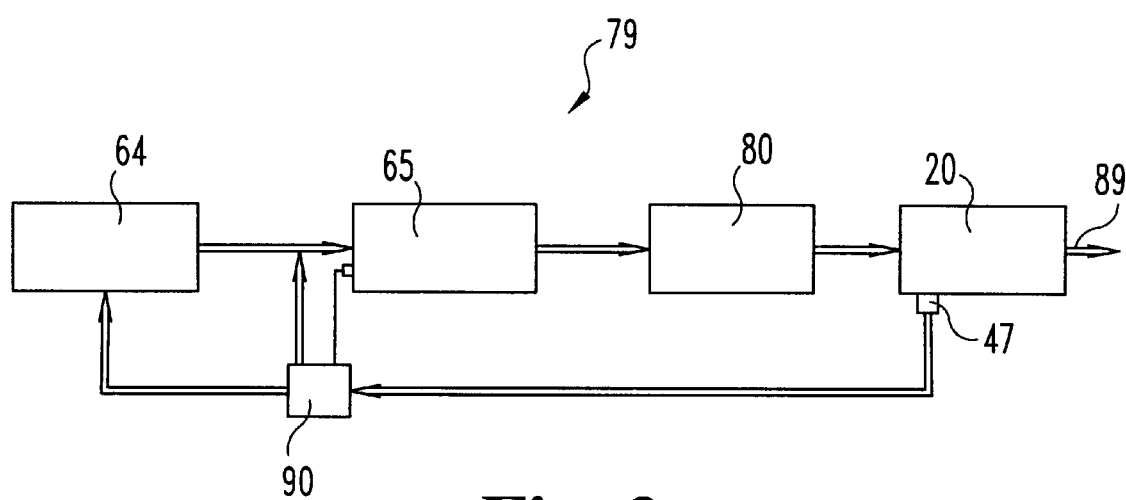
FIG. 3 is a diagrammatic illustration of a fuel filtering system which includes the FIG. 1 fuel filter according to the present invention.

Referring to FIG. 3, the fuel filtering system 79 associated with fuel filter 20 is diagrammatically illustrated. System 79 includes, in addition to fuel filter 20, a fuel tank 64, primary fuel filter 65, and fuel pump 80. The fuel is contained within tank 64 and is pulled through the primary fuel filter 65 by the action of pump 80. The suction force of pump 80 pulls the fuel through the filter 65 and then with a positive pressure, pushes the fuel through fuel filter 20. The excess fuel return port 43 by way of fitting 47, is connected to the fuel tank 64, such that excess fuel, accumulated water, and possibly some air, is returned to the fuel tank 64. The requisite fuel for the engine is pumped to the two banks of injectors as denoted by arrow 89.

Depending on the overall temperature of the fuel which is delivered to the primary fuel filter from the tank, it is possible for the fuel to wax-up on the surface of the filter cartridge of the primary fuel filter 65. Since work is done on the excess fuel which is returned to the fuel tank, its temperature will be elevated. System 79 is designed so that the temperature of the fuel on the inlet side of the primary fuel filter 65 can be sensed and depending on the fuel temperature, the returned fuel can either be routed back to the fuel tank or to the primary fuel filter or both. As is illustrated, there is a diverter valve 90 which is in communication with the temperature sensing probe on the inlet side of the primary fuel filter. Valve 90 is configured to direct either all of the returned fuel to the primary fuel filter or only a portion of it, with the remainder being directed back to the fuel tank, depending on the temperature of the fuel on the inlet side of filter 65. In operation, if the temperature sensed on the inlet side of the primary fuel filter suggests that the fuel may be experiencing some degree of thickening or waxing-up, then by diverting some or all of the warmer returned (excess) fuel, the problem attributed to the lower temperature fuel can be alleviated. By introducing the warmer returned fuel directly to the primary fuel filter, it is intended to lower the viscosity of the fuel at that point, allowing freer flow through the primary fuel filter.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fuel filter comprising:

a housing defining a chamber having upper and lower ends, an inlet for un-filtered fuel, an outlet for filtered fuel, an outlet for un-filtered fuel and air including an integral flow passageway integral with a wall of the housing that defines a flow inlet aperture facing the upper end of the chamber, and a standpipe on the bottom of the chamber for connecting the outlet for filtered liquid to a tubular filter cartridge;

a tubular filter cartridge disposed in the housing having upper and lower ends and radially inner and outer surfaces, an upper end cap disposed adjacent the upper end of the chamber for closing the upper end of the tubular filter cartridge, wherein the upper end cap includes an air vent tube positioned adjacent the radially outer surface of the filter cartridge, wherein the air vent tube includes a flow inlet aperture positioned adjacent the upper end of the chamber and extends downwardly to an exit opening received within the integral flow passageway through the flow inlet aperture to fluidly connect the upper end of the chamber to the integral flow passageway, and an annular lower end cap for closing the lower end of the tubular filter cartridge and receiving the standpipe;

whereby air collecting at the upper end of the chamber is directed to the outlet for unfiltered fuel and air via the air vent tube and integral flow passageway.

2. The fuel filter of claim 1 wherein said housing is a unitary structure and said flow passageway is part of the unitary construction of said housing.

3. The fuel filter of claim 1 wherein said air vent tube is integral with said end cap.

4. The fuel filter of claim 1 which further includes a pressure-regulated drain valve having an outlet, the outlet of said drain valve being in flow communication with the outlet for unfiltered fuel of said housing, said drain valve being movable in said housing between a normally-closed position and a flow-enabling position.

5. The fuel filter of claim 4 wherein said pressure-regulated drain valve includes a movable plunger and a biasing spring which exerts a closing spring force on said plunger to hold said pressure-regulated drain valve in said normally-closed position.

* * * * *